(No Model.) 2 Sheets—Sheet 1.
T. CORSCADEN.
SHELF BRACKET.
No. 511,590. Patented Dec. 26, 1893.
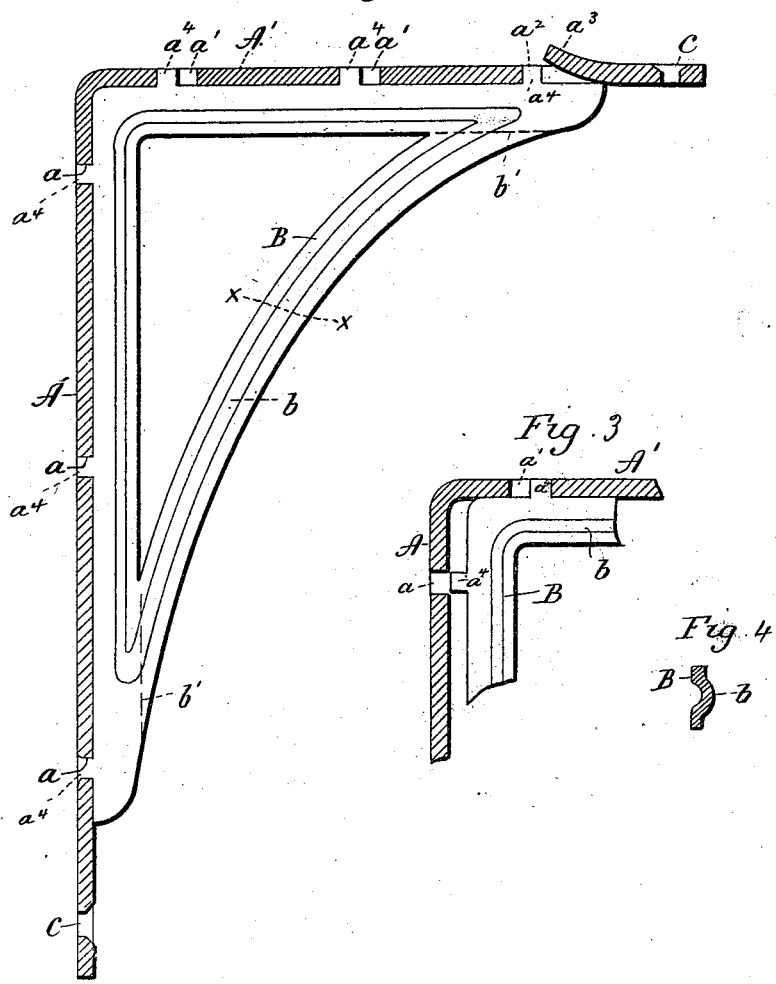
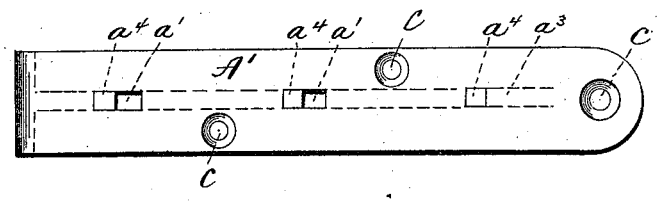
Witnesses
J. H. Shumway
Lillian D. Kelsey
Thomas Corscaden
Inventor
By Attys
Earl H. Seymour
THE NATIONAL LITHOGRAPHING COMPANY,
WASHINGTON, D. C.

(No Model.) 2 Sheets—Sheet 2.
T. CORSCADEN.
SHELF BRACKET.
No. 511,590. Patented Dec. 26, 1893.
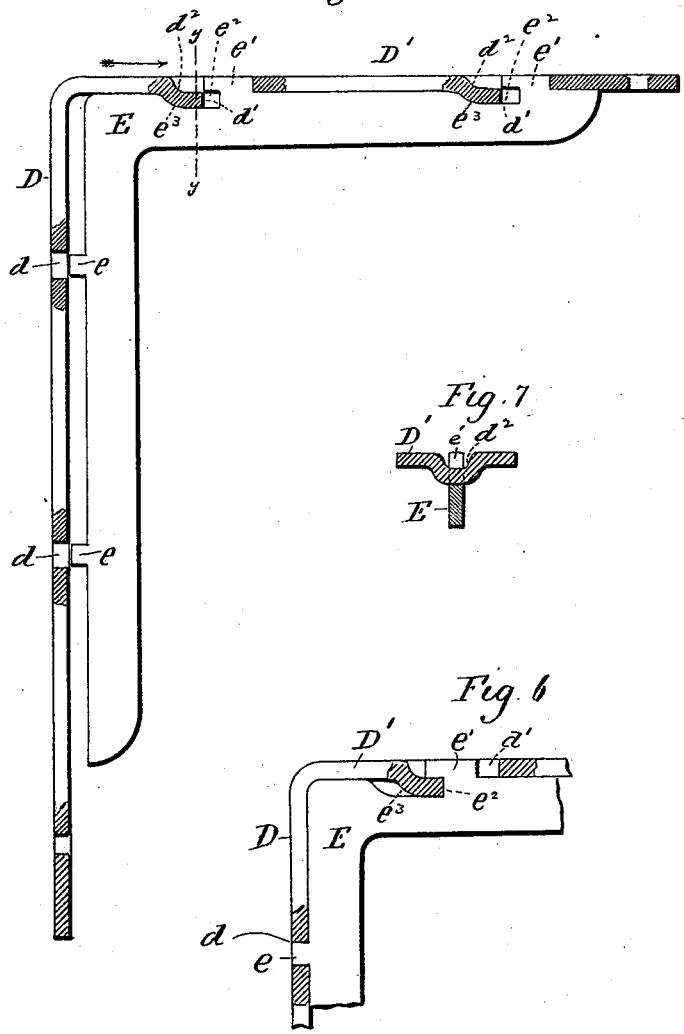

UNITED STATES PATENT OFFICE.

THOMAS CORSCADEN, OF NEW BRITAIN, CONNECTICUT, ASSIGNOR TO THE STANLEY WORKS, OF SAME PLACE.

SHELF-BRACKET.

SPECIFICATION forming part of Letters Patent No. 511,590, dated December 26, 1893.

Application filed April 21, 1893. Serial No. 471,268. (No model.)

*To all whom it may concern:*

Be it known that I, THOMAS CORSCADEN, of New Britain, in the county of Hartford and State of Connecticut, have invented a new Improvement in Shelf-Brackets; and I do hereby declare the following, when taken in connection with accompanying drawings and the letters of reference marked thereon, to be a full, clear, and exact description of the same, and which said drawings constitute part of this specification, and represent, in—

Figure 1, a view partly in vertical section and partly in elevation of a shelf-bracket constructed in accordance with my invention; Fig. 2, a plan view thereof; Fig. 3, a broken view partly in section and partly in elevation showing the brace after its lugs have been inserted into the outer ends of the elongated openings in the shelf-plate, whereby the lugs upon its vertical edge are brought into position to be introduced into the openings in the wall-plate; Fig. 4, a sectional view of the brace on the line $x$—$x$ of Fig. 1; Fig. 5, a view partly in vertical section and partly in elevation of one of the modified forms which a bracket constructed in accordance with my invention may assume; Fig. 6, a similar broken view showing the brace in its assembled position; Fig. 7, a view in vertical section on the line $y$—$y$ of Fig. 5, to show the depressions formed in the shelf-plate of the body of the bracket.

My invention relates to an improvement upon the wrought-metal shelf-bracket for which Letters Patent of the United States No. 493,484, dated March 14, 1893, were issued on my application. In making the bracket described and claimed in the said patent, it was necessary to separate the wall and shelf-plates, forming the body thereof, by springing them apart, in order to effect the introduction of the lugs with which the brace is provided into the openings formed to receive them in the plates. In making a very heavy bracket, it would not, obviously, be practicable to spring its body as described, and my present invention has for its object the construction of a wrought-metal bracket which shall not require any springing of its body in the assemblance of its members.

A further object of my invention is to produce, at a low cost for manufacture, a bracket, which shall be comparatively light, of great strength, and have finer and sharper lines than can be secured in cast-metal brackets.

With these ends in view, my invention consists in a wrought metal bracket composed of a body and a brace, the former consisting of a single strip of wrought-metal, bent transversely between its ends to form wall and shelf-plates, both of which have lug openings formed in them, and the latter having two edges located at a right angle to each other, and each furnished with lugs, the openings of one of the said plates being made enough longer than the width of the lugs on the corresponding edge of the brace to permit the said body and brace to go together without springing the former.

My invention further consists in certain details of construction and combinations of parts as will be hereinafter described and pointed out in the claims.

As shown by Figs. 1 to 4 inclusive of the drawings, the body of my improved bracket consists of a single strip of wrought metal, bent transversely a little to one side of its longitudinal center, to form a wall-plate A, and a shelf-plate A', which stand at a right angle to each other, the former having three rectangular lug-openings $a$ $a$ $a$, located at suitable distances apart, and the latter having three rectangular clearance lug-openings $a'$ $a'$ and $a^2$ also located at suitable distances apart. The openings last mentioned I call clearance openings, because they afford clearance for the assemblance of the body and brace of the bracket. Thereto they are made longer than the other openings, as will be fully explained later on. The opening $a^2$ it will be noted, is nearest to the outer end of the plate.

The brace B, of the bracket illustrated by the figures mentioned, is triangular in shape, and formed from a single piece of wrought-metal, the center of which is cut away to lighten the bracket, and improve its appearance. As shown, the said brace is constructed with a corrugation $b$, which stiffens it, but this is not essential. Nor is it essential that the brace be triangular in form, for if desired its inwardly bowed longest side may be cut away on the broken lines $b'$ $b'$, to be seen in Fig. 1. But however the brace is made as to the details of its construction, it must have two straight sides located at a right angle to each other, and each furnished with lugs for the attachment of the brace to the body of the bracket. As shown in the said figures of the drawings, each of the said straight sides of the brace is provided with three lugs $a^4$, arranged in correspondence with the arrangement of the lug-openings before mentioned as being formed in the wall and shelf plates of the body of the bracket respectively.

The lug-openings $a\ a\ a$ in the wall-plate of the bracket, are adapted in form to have the lugs on the adjacent edge of the brace fit closely into them, while the clearance lug-openings $a'\ a'$ and $a^2$ formed in the shelf plate of the bracket, must be at least twice as long as the lugs on the adjacent edge of the brace are wide, and this may be a permanent elongation as in the case of the openings $a'\ a'$, or a temporary elongation as in the case of the opening $a^2$, the outer, end wall of which is lifted in the form of a tongue $a^3$.

When the body and brace of the bracket are put together, the brace must be placed against either the wall or the shelf-plate of the body. Under the construction described above, it is placed against the shelf-plate of the body, as shown by Fig. 3 of the drawings, the lugs on its horizontal edge entering the outer ends of the clearance openings $a'\ a'$ and $a^2$. This permits the lugs upon its vertical edge to be brought into line with the openings $a\ a\ a$ in the wall-plate of the bracket, as shown by Fig. 3, from which it is clear that the brace is then in position to be pushed home into the extreme corner of the body of the bracket, the lugs upon its horizontal edge moving into the inner ends of the clearance openings in the shelf-plate, while the lugs upon its vertical edge will move into the openings in the wall-plate. The lugs are now firmly secured in the said openings, either by riveting down their outer ends, or by brazing or welding them in place. Fig. 1 of the drawings shows the lowest lug on the vertical edge of the brace as riveted down. When the brace is in its final position, the outer ends of the clearance openings $a'\ a'$ will be unoccupied, and if desired, the spaces thus formed may be filled up with solder, or other material. As to the opening $a^2$, when the body and brace have been rightly assembled, that is reduced to the size required to fit the lug entered into it by forcing the tongue $a^3$ which is in fact its upturned outer end wall, down into the plane of the plate. All of the clearance openings may be formed like the opening $a^2$ if found desirable. Even one opening so formed, and especially when located as shown in Fig. 1, facilitates the assembling of the bracket, as the tongue will lock the brace in place while the lugs are being riveted, welded, brazed, or otherwise secured within their respective openings.

Although I have shown the shelf-plate as provided with the clearance openings, it is obvious that I may locate them in the wall-plate if desired, but by preference they will be located in the shelf-plate, as there they will be less observed. The wall and shelf-plates of the bracket are also provided with the required number of perforations C, adapting the bracket to be put up and the shelf to be secured to it.

Figs. 5, 6 and 7 show one of the modified forms which my improved bracket may assume. In this modified construction, the body of the bracket is composed of a single strip of wrought metal, bent transversely to form a wall-plate D, and a shelf-plate D' extending at a right angle to each other. The brace E, of this construction is formed from a single piece of wrought metal, and has the shape of an open triangle. The wall plate of the bracket has two lug-openings $d\ d$ formed in it, while the shelf-plate has two clearance lug-openings $d'\ d'$ the inner end walls whereof are formed in the bottoms of depressions $d^2\ d^2$ set downward from the face of the said plate. The vertical leg of the brace is furnished with two lugs $e\ e$ adapted to fit snugly into the lug openings $d\ d$ aforesaid, while the horizontal leg of the brace is furnished with two wider lugs $e'\ e'$, having their inner edges constructed with notches $e^2\ e^2$, the edge of the said leg being cut away in the rear of the said notches, as at $e^3\ e^3$. In assembling the body and brace of this bracket the lugs $e'\ e'$ on the horizontal leg of the brace are inserted through the clearance lug-openings $d'\ d'$ in the shelf-plate of the bracket, whereby the lugs $e\ e$ on the vertical leg of the brace are brought into line with the lug-openings $d\ d$ in the wall-plate of the bracket. The brace is now pushed home, clearance being thereto provided by the notches $e^2$ formed in the lugs $e'\ e'$ the said notches receiving the depressed inner end walls of the clearance lug-openings $d'\ d'$. The two parts of the bracket having been thus assembled, the lugs are secured in place by riveting, brazing, welding, or otherwise. By forming the depressions $d^2$ in the shelf-plate, the riveted ends of the lugs are kept below the surface thereof, and hence out of the way. In this construction the clearance openings permit the brace to be brought into position for assemblance while the notched lugs permit the final act of assemblance.

It is obvious that the lugs and openings of the two members of my improved bracket may be constructed and arranged in still other ways without departing from my invention, which broadly comprehends the formation of clearance openings in one of the plates of the body of the bracket, so as to permit the brace of the bracket to be assembled with the said body without springing the same. I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. A wrought-metal shelf-bracket, composed of two members, namely, a body formed from a single piece of sheet-metal, and comprising a wall and a shelf-plate, each having lug-openings, and a brace having two straight edges located at a right angle to each other, and each furnished with lugs to fit into the openings in the said plates, the openings in one of the said plates and the lugs on the corresponding edge of the brace being constructed and arranged to permit the brace to be moved after the said lugs have been entered into the said openings to enter the lugs on the other edge of the brace into the openings in the other plate, substantially as described and whereby the two members of the bracket may be assembled without springing the body.

2. A wrought-metal shelf-bracket, composed of a body consisting of a strip of wrought-metal bent transversely to form wall and shelf-plates, each of which is constructed with lug-openings, those of one plate being elongated, and a brace having two edges located at a right angle to each other, and each furnished with lugs, substantially as set forth, and whereby by the elongation of the openings in one plate, the body and brace may be assembled without springing the former.

3. A wrought-metal shelf bracket, composed of a body consisting of a single strip of wrought-metal, bent transversely to form wall and shelf-plates, each of which is constructed with lug-openings of which those of one plate are elongated, and one or more of the elongated openings being made by displacing their outer end walls in the form of tongues, and a brace having two edges located at a right angle to each other, and each furnished with lugs adapted to enter the said openings in the plates of the body, substantially as described, and whereby by the elongation of the openings in one plate, the body and brace may be assembled without springing the former, and the brace may be locked in place by forcing the tongue or tongues back into the plane of the plate from which they were displaced.

In testimony whereof I have signed this specification in the presence of two subscribing witnesses.

THOMAS CORSCADEN.

Witnesses:
  E. A. MERRIAM,
  G. L. REYNOLDS.